United States Patent
Golle et al.

(10) Patent No.: US 7,362,711 B2
(45) Date of Patent: Apr. 22, 2008

(54) METHOD AND APPARATUS FOR DETECTING AND CORRECTING MALICIOUS DATA IN AN AD-HOC NETWORK

(75) Inventors: Philippe Golle, San Francisco, CA (US); Daniel H. Greene, Sunnyvale, CA (US); Teresa F. Lunt, Palo Alto, CA (US); Jessica N. Staddon, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 694 days.

(21) Appl. No.: 11/014,016

(22) Filed: Dec. 16, 2004

(65) Prior Publication Data

US 2006/0133289 A1 Jun. 22, 2006

(51) Int. Cl.
*H04J 1/16* (2006.01)
*H04J 3/14* (2006.01)
(52) U.S. Cl. .................................. 370/241; 370/252
(58) Field of Classification Search ............. 370/241, 370/252, 242, 245, 310, 338, 400, 445, 229, 370/328; 714/100, 1; 726/22, 23
See application file for complete search history.

(56) References Cited

U.S. PATENT DOCUMENTS

| | | | |
|---|---|---|---|
| 6,246,950 B1* | 6/2001 | Bessler et al. | 701/99 |
| 2004/0010492 A1* | 1/2004 | Zhao et al. | 707/3 |
| 2006/0167784 A1* | 7/2006 | Hoffberg | 705/37 |

* cited by examiner

*Primary Examiner*—Ajit Patel
(74) *Attorney, Agent, or Firm*—Park, Vaughan & Fleming LLP (57) ABSTRACT

One embodiment of the present invention provides a system that detects malicious data in an ad-hoc network. During operation, the system receives data at a node in the ad-hoc network, wherein the data was sensed and redundantly communicated to the node by other nodes in the ad-hoc network. Note that in this ad-hoc network, a given node senses data associated with itself and with proximate nodes in the ad-hoc network. In this way, proximate nodes in the ad-hoc network can redundantly sense data about each other. Next, the system determines at the node if the received data, along with data sensed locally by the node, is consistent. If not, the system uses a model which accounts for malicious nodes to determine an explanation for the inconsistency.

22 Claims, 7 Drawing Sheets

METHOD AND APPARATUS FOR DETECTING AND CORRECTING MALICIOUS DATA IN AN AD-HOC NETWORK

BACKGROUND

1. Field of the Invention

The present invention relates to distributed computer systems. More specifically, the present invention provides a method and an apparatus for detecting and correcting malicious data in an ad-hoc network without relying on an authentication infrastructure.

2. Related Art

Recent advances in microprocessor technologies have made it possible to incorporate significant amounts of computing power into vehicles, such as automobiles. For example, a typical new automobile presently has 40 to 50 microprocessors on-board, and high-end luxury vehicles include more than 100 microprocessors. At the same time, advances in wireless networking technologies are enabling these vehicles to efficiently communicate with each other.

These developments have lead to the development of Vehicular Ad-hoc NETworks (VANETs). VANETs enable geographically distributed vehicles to share data about vehicle locations and velocities, as well as information about weather, traffic and road conditions. This information can be used to facilitate dynamic route planning, safety and weather advisories, and road maintenance planning.

Unfortunately, a malicious vehicle which provides erroneous data can adversely affect nearby vehicles. For example, a malicious vehicle could report an illusory traffic jam on a freeway to cause other vehicles to travel on alternate routes. Diverting traffic in this way enables the malicious vehicle to avoid traffic on the freeway, but also causes unnecessary congestion on the alternate routes.

This problem can potentially be solved through network security mechanisms. The traditional approach to network security involves a key management solution which facilitates verifying data integrity and authenticating network "insiders." Besides raising privacy concerns and being unwieldy for a VANET, this approach solves the wrong problem. In a VANET, far simpler attacks than data modification exist, such as, transmitting fraudulent data about road congestion or vehicle position. Furthermore, in large-scale VANETs there is no guarantee that previously honest nodes will not be corrupted in the future. Hence, security in a VANET depends upon solving the potentially more challenging problem of detecting and correcting malicious data.

Redundancy checks are commonly built into distributed systems to mitigate the threats posed by faulty or malicious participants. However, these redundancy checks can fail when a single adversary can present multiple distinct identities. These so-called "Sybil" attacks enable an adversary to assert virtual control over a substantial fraction of the system, contrary to the assumption on which redundancy checks are based.

A number of defenses have been proposed to guard against Sybil attacks, but they all have significant shortcomings in the context of a VANET (see [Newsome04] J. Newsome, E. Shi, D. Song and A. Perrig, "The Sybil Attack in Sensor Networks: Analysis and Defenses," *Proceedings of the Third Intl. Symposium on Information Processing in Sensor Networks*, 2004.) These defenses and their shortcomings in the context of a VANET are briefly described below.

1. Radio resource testing assumes that a radio cannot send or receive simultaneously on more than one channel. However, it does not apply to VANETs, since a node can cheaply acquire multiple radios.
2. Registration assumes each participant is assigned a unique identity by a central, trusted authority. License plate numbers which identify vehicles are an example of that approach. However, providing unique electronic identifiers in a VANET raises more serious privacy concerns than physical license plates, and hence is unlikely to gain broad public acceptance. Furthermore, an approach based on assigning unique identifiers scales poorly (as demonstrated by the expense of administering license plate registrations). Hence, as the number of participants in the network grows larger, the task of maintaining and revoking identities becomes unmanageable.
3. Position verification operates by verifying the position of each node and assumes that identities that come from the same location belong to one and the same participant. However, such position verification techniques assume that nodes are static and hence do not apply to VANETs, because vehicles (nodes) are typically assumed to be in motion.

Hence, what is needed is a method and an apparatus that effectively guards against malicious data attacks (e.g., Sybil attacks) in a vehicular ad-hoc network (VANET).

SUMMARY

One embodiment of the present invention provides a system that detects malicious data in an ad-hoc network. During operation, the system receives data at a node in the ad-hoc network, wherein the data was sensed and redundantly communicated to the node by other nodes in the ad-hoc network. Note that a node in the ad-hoc network senses data associated with itself and with proximate nodes in the ad-hoc network. In this way, proximate nodes in the ad-hoc network can redundantly sense data about each other. Next, the system determines at the node if the received data, along with data sensed locally by the node, is consistent. If not, the system uses an a model which accounts for malicious nodes to determine an explanation for the inconsistency.

In a variation on this embodiment, nodes in the ad-hoc network are vehicles, and the data includes location information for the vehicles.

In a variation on this embodiment, determining an explanation for the inconsistency involves: generating a set of explanations for the inconsistency; ranking the set of explanations according to likelihood; and selecting an explanation from the set of explanations based on the ranking.

In further variation, generating the set of explanations involves facilitating "local distinguishability" by comparing data which was sensed locally by the node with data received from the proximate nodes to determine if the proximate nodes are telling the truth, and if so labeling them as truthful nodes.

In a further variation, generating the set of explanations also involves facilitating "extended distinguishability" by comparing data provided by truthful nodes with data received from nodes which are proximate to the truthful nodes to determine if the proximate nodes are telling the truth, and if so labeling them as truthful nodes.

In a further variation, ranking the set of explanations according to likelihood involves considering simpler explanations to be more likely than more complicated explanations.

In a variation on this embodiment, the model which accounts for malicious nodes also accounts for the possibility that malicious nodes can generate fictitious data from fictitious "spoof nodes" that do not actually exist.

In a variation on this embodiment, the system uses the explanation for the inconsistency to perform a remedial action.

In a variation on this embodiment, the received data can be redundantly communicated between nodes in the ad-hoc network using: a flooding protocol, a gossip protocol, or an epidemic protocol.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

General Technique

One embodiment of the present invention provides a general, sensor-driven technique that allows nodes to detect incorrect information and identify the node or nodes that are the source of this incorrect information with high probability. In this embodiment, each node maintains a model of the VANET containing all the knowledge that the node has of the VANET. Physics and safety dictate certain rules (e.g. two nodes can never occupy the same location at the same time) and statistical properties of events (nodes rarely travel faster than 100 mph; faster moving nodes are better spaced) that make up the model. A node may seed the model with data it has observed directly (we assume that a node always trusts the data it has gathered itself). The node can then test the validity of data received from other nodes against this model of the VANET. If all the data agrees with the model (perhaps with high probability), the node accepts the validity of the data.

To deal with data that is inconsistent with the model of the VANET we have developed a heuristic that we term adversarial parsimony. In short, parsimony assumes that an attack involving a few malicious nodes is more likely than an attack that requires collusion between a large number of nodes. Given this adversarial model, a node will always look for a way of restoring consistency based on the simplest possible explanation for the disagreement. This often resolves to assuming the smallest possible number of corrupt nodes, and hence, nodes often need to be able to tell at least some other nodes apart from one another. Without that ability, a malicious node can create additional fictitious nodes to bolster its view of the VANET. This is known as a Sybil attack.

To address such attacks we leverage the sensor capabilities of the nodes. The sensor capabilities of the nodes enable the distinguishing of nodes in the network to a large degree; hence thwarting the Sybil attack. After determining how many nodes are indeed present, a node searches through explanations for the inconsistent data based on the possible presence of malicious nodes, and orders the explanations in accordance with the parsimony heuristic. The data that is accepted by the node is consistent with the highest ranking explanation or explanations.

Figure 1:
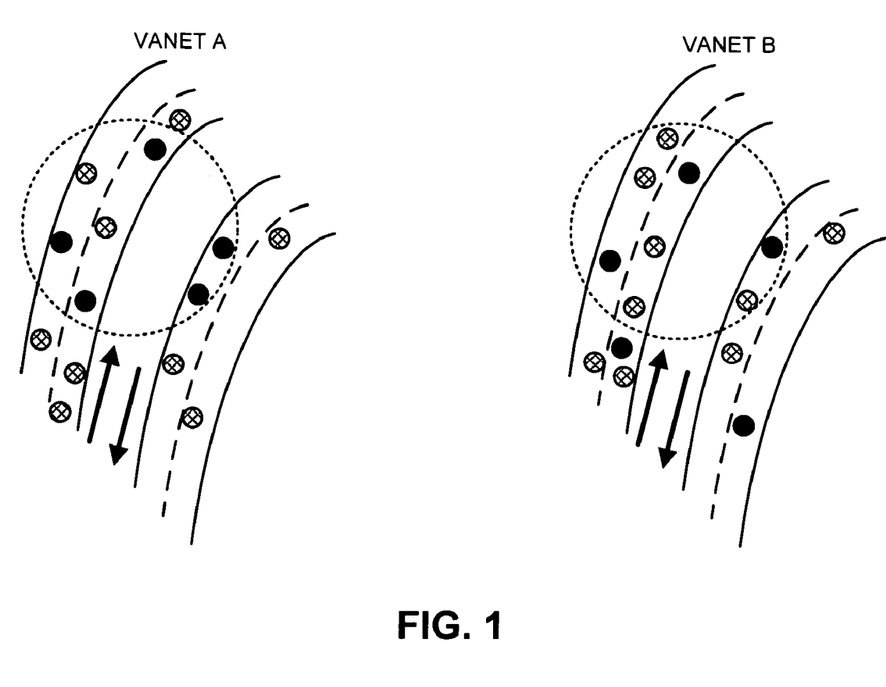
FIG. 1 illustrates colluding malicious nodes in a VANET in accordance with an embodiment of the present invention.

Typically distributed protocols work best as network density increases, and our approach is no exception. Indeed, the network density assumption provides strong justification for our approach. In a sufficiently dense network it is reasonable to assume multiple data transmission pathways between nodes, thus affording the network sufficient data to detect inconsistencies. Further, density combined with mobility supports parsimony, as attack success depends on certain topologies of malicious nodes and these topologies are hard to maintain in a mobile network. For example, the colluding adversaries (illustrated as black circles) in part A of FIG. 1 are successful in convincing the honest node (illustrated as cross-hatched circles) of false data, but in a VANET it is difficult to maintain such a configuration for any significant duration.

In general, this approach yields algorithms that work on a sufficient time-scale for dynamic route discovery. In particular, note that the model of the VANET is constructed offline (to a large extent it can be constructed when manufacturing the vehicles), incoming data can be evaluated continuously and past work can be leveraged in time-critical situations. In addition, we emphasize that our approach is specifically designed, and enabled by, the properties of a VANET. In general, ad-hoc network security proves quite challenging, often requiring strong assumptions such as no node collusion and no "insider" attacks. Remarkably, when applying our approach to the VANET setting, we are able to provide security against strong, colluding adversaries who may well be trusted members of the network.

We demonstrate how position verification can be used to prevent Sybil attacks in VANETs. In addition, we use sensors to enable public key exchange over what is essentially location-limited channel.

Another component of our approach is something we term adversarial parsimony. Informally this means finding the best explanation for corrupted data. The expression "Occam's Razor" or "Principle of Parsimony" is often used for techniques that choose the simplest explanation as the best. However, as we will see later, more sophisticated statistical approaches usually combine likelihood calculations with some measure of the complexity of the model. To remain general, we have formulated adversarial parsimony as using any ordering relationship among the explanations for the corrupted data to determine the "best" explanation(s).

We use sensor data in order to detect malicious nodes. In doing so, we allow for a variety of sensing mechanisms, that is nodes can sense properties of the network directly without relying on the presence of neighboring honest nodes. This affords the nodes increased autonomy when deciding the validity of VANET data.

Adversaries in a VANET

In this section we consider the different features of an adversarial attack as well as the potential for adversaries to use our data validation approach to their advantage.

Classification of Attacks

Recall we term any attack in which a node attempts to convince other VANET nodes of incorrect data a "malicious data attack". A malicious node is successful in such an attack when the target node or nodes accepts the incorrect data as valid. We offer a broad taxonomy of the malicious data attacks in VANETs. Our taxonomy overlaps somewhat with that given in [Newsome04] in the distinguishing of local and extended targets, but differs in that, unlike [Newsome04], it is tailored specifically to VANETs. For example, many of the settings considered in [Newsome04] involve fixed nodes and collaborative decision-making techniques such as voting. In such a network, spoofed nodes (or "Sybil nodes") can be used to direct the election as desired by the malicious node, so that issues such as the simultaneous participation of spoofed nodes are very important. In our networks, although nodes gather sensor data from other nodes, decisions are not based on the accumulation of agreeing data but rather on the likelihood of particular attack scenarios in a VANET. Hence, we find it more useful to distinguish attacks based on their nature, target (local or projected), impact (undetected, detected, or corrected) and scope (limited or extended). In the following we consider each of these notions in turn.

Attack Nature. There are many different types of malicious VANET data. An adversary may report false information about other parts of the VANET (e.g. nonexistent traffic jams) or false information about itself (e.g. wrong location). Because each node uses all the VANET data it collects to evaluate the validity of new information, the density of the network and the sensors available may make some attacks unpreventable. For example, when nodes can only sense the distance to other nodes rather than precise location, the combined sensor data can only reduce the location of an adversarial node to a certain small "territory." Within its territory the adversary can mount the Sybil attack at will, creating spoofed nodes, and as long as the attack conforms to the model of the VANET, it will go undetected.

Attack Target. We allow for strong adversaries who are able to communicate over long distances. An adversary with such an extended communication radius has flexibility in the location of the node or nodes that it attempts to convince of false data. In examples that appear in following sections, we distinguish between local targets (i.e. those within close proximity of the adversary) and remote targets. With a local target, the adversary may have more success since the likelihood of conflicting data from neighboring nodes is reduced. That said, the proximity necessary for a local attack is difficult to maintain, hence we view vulnerability to a local attack to be less worrisome. An adversary may have more remote target possibilities, but data received from nodes closer to the target may make such attacks unsuccessful.

Attack Scope. The scope of an uncorrected attack is measured in terms of the area of nodes that have VANET data of uncertain validity because of the attack. We call such nodes the victim nodes. The scope of an attack is limited if the victims consist of a small area of nodes. Note that this area may be a small neighborhood of the malicious nodes, or in the case of a remote target, it may be a small area remote from the malicious nodes. We term an attack affecting a larger area of nodes an extended attack. Our approach is designed to forestall a local attack from growing into an extended attack through information propagation.

Attack Impact. When an adversary attempts to convince the target nodes of incorrect data there are three possible outcomes. The attack may be undetected by the target nodes (and thus completely successful) it may be detected by one or more target nodes but still leave the nodes with uncertainty about received data, and in the most favorable outcome, the attack may be detected and corrected (i.e. no data uncertainty remains). An undetected attack can occur when the target nodes are isolated or completely surrounded by malicious nodes; in this case the target node will accept incorrect data. When target nodes have some access to honest nodes they may be able to detect that an attack is underway through inconsistencies in the data they collect, but at the same time they might decline to correct the attack due to insufficient information, or otherwise risk making an incorrect diagnosis via the parsimony argument (a risk, for example, in VANET A of FIG. 1) in which case the malicious data might remain uncorrected. With access to sufficiently many honest nodes or the ability to collect precise data, the target nodes may be able to use the parsimony argument to correctly identify the false event information and correct for the attack.

Exploiting the Model

A central aspect of the parsimony heuristic is a model of the possible attacks, so that the most likely explanation (of the attack in progress) can be used to resolve inconsistencies in the database. In this specification we have defined the model of the adversary in general terms as specifying an ordering relation among possible explanations for inconsistencies in the data. When specifying the model as an ordering relation it can be formulated combinatorially (e.g. the explanation with the fewest malicious nodes) or with more elaborate statistical models. In later sections, we give concrete examples of models of the adversary, but here we wish to address a more fundamental question—can the adversary exploit the model?

Usually statistical methods are applied in situations in which the phenomena will not change in response to the statistical methods used to study the phenomena. However, in the setting of a VANET, an adversary might well choose to modify its attack based on knowledge of the adversarial model in use. More specifically, it is possible for an adversary to devise an attack whose effects are hidden by other (incorrect) explanations deemed more likely in the ordering relation used to determine the most likely attack.

This issue is dealt with in several ways. First, the initial model of the adversary should be strong enough that these hidden attacks are more costly than simpler attacks. Second, we envision that the adversarial model will be changeable. This allows for short term adjustments in response to changes in adversarial patterns of attacks (in this way popular hidden attacks will eventually be considered more likely). It also allows for longer term adjustments as adversaries develop new attacks or exploit new technology (anticipating the usual "arms race" that develops in security systems). Nevertheless, even if the possibility of more sophisticated hidden attacks is incorporated into the model, the possibility of adversaries using more mundane attacks will always make the task of a sophisticated attacker easier.

Distinguishability

One of our techniques for telling nodes apart relies on four assumptions: (1) a node can bind observations of its local environment with the communication it receives, (2) a node can tell its neighbors apart locally, (3) the network is "sufficiently" dense and (4) after coming in sufficiently close contact, nodes can authenticate their communication to one another. In this section, we review these four assumptions and explain how they may be satisfied in practice.

Local Distinguishability

We assume that a node can tell its neighbors apart locally. More precisely, whenever a node A receives messages from two distinct nodes B and C that are sufficiently close to A, node A can verify that these messages come from separate physical entities. If this verification fails, A must assume that all messages came from a single node that claimed to be both B and C. The assumption of local distinguishability allows a node to apply the parsimony heuristic within the local neighborhood where the node has the ability to distinguish neighbors. To illustrate how local distinguishability may be achieved in practice, we propose the following example. Local distinguishability may be achieved in a VANET by meeting these two conditions:

1. A node can tie a message with the physical source of that message; and
2. A node can measure the relative position (with respect to its own position) of the source of a message (within a certain radius).

These conditions are met, for example, if nodes are equipped with cameras and exchange messages with one another using signals in the visible or infrared light spectrum. The node may estimate the relative position of the source of the message (the beam of light) by analyzing the images taken by its camera. Furthermore, the message is directly tied to the physical source from which it emanates since the message consists of the beam of light itself.

Other physical characteristics of a transmission can be used to compute the location of the sender of a message, such as the time of arrival (a measurement of the roundtrip time between two nodes), the angle of arrival (for radio signals) or the received signal strength (also for radio signals). These measurements, while potentially easier to collect than camera images, may be vulnerable to some amount of tampering as nodes may reduce (or, at higher cost, increase) the strength of their signal. Nevertheless, as we shall see, the data provided by these measurements remains useful to distinguish between nodes.

Extended Distinguishability

We have just shown how nodes can establish local neighborhoods of distinguishability. We discuss now how to expand distinguishability in both time and space, beyond the immediate neighborhood in which a node can validate the existence of other nodes by direct physical sensing. This expansion is achieved by letting nodes exchange information with one another about what they sense in their local neighborhoods. Communication over larger distances may in practice be limited by latency and bandwidth considerations. We ignore this issue however, and assume an ideal model of propagation, since all the communication we care about takes place over a relatively small geographic area (the value of information in a VANET decreases rapidly as it gets further removed from its source.)

Network density. We assume that the graph of possible communication between nodes is always connected, and furthermore that there exist multiple communication pathways between pairs of nodes. We make this assumption even in the presence of malicious nodes, which may refuse to forward messages. The higher the connectivity of the graph, the better nodes can carry the parsimony heuristic beyond the immediate bounds of their neighborhoods of distinguishability. The following example illustrates this point. Assume a node A has two nodes, $B_1$ and $B_2$, in its neighborhood of distinguishability. If both $B_1$ and $B_2$ claim that nodes $C_1$ and $C_2$, located outside of A's neighborhood of distinguishability, are distinct, then A may extend its belief that nodes $B_1$ and $B_2$ are distinct (and not both malicious) to believing that nodes $C_1$ and $C_2$ are also distinct.

Authenticating communication. We assume that every node has a private/public key pair at any given time. These keys allow nodes to authenticate one another's messages over short periods of times (a few seconds to a few minutes). The key pairs are not meant to be long lived: they are generated by a node itself (thus obviating key distribution or certification) and do not allow for extended tracking of vehicles, since they are refreshed periodically. A node may generate new key pairs constantly. We assume only that most nodes are willing to keep the same key pair for short periods of time. Because of these weak identification assumptions, this approach has the potential for good privacy protection (we discuss privacy in a following section).

Signing messages extends local distinguishability across time and space for honest nodes, since messages coming from a node can be authenticated as long as the node keeps the same public key, regardless of where and when the messages originate. To give a simple example, consider a node A that has had at one time two nodes B and C within its local neighborhood of distinguishability and has thus been able to establish that B and C are truly distinct nodes. Though they may move out of A's neighborhood of distinguishability, nodes B and C remain distinguishable to A as long as they sign their messages with the same public keys. Distinguishability is lost when B and C refresh their public keys. We allow for strong adversaries who may collude and exchange private keys. However, as demonstrated in a following section, once a node has been identified as malicious, any data distributed by this node (e.g. node location observations) are considered to be of questionable validity. Indeed, if a large group of malicious nodes share private keys with the goal of all appearing to be at a location that only contains one of them, then if just one of them is conjectured to be suspicious (malicious or a spoof), all of them will be, as the attack requires that they all observe each other. Hence, large-scale abuse of distinguishability may actually be counterproductive.

Privacy

Our decentralized approach to data validation is designed to offer good privacy protection to nodes in a VANET. Data is tested for consistency in a distributed fashion, so that privacy sensitive data need not flow to a centralized location. In order to track an individual vehicle, an attacker must own nodes near that vehicle at all time, which is a costly attack.

We have shown that authenticated communication facilitates extended distinguishability of nodes, but no long lived identification of nodes is required. Nodes can change their identification frequently by generating new keys on a regular basis, thereby making it difficult to link data over longer time periods and infer the identity and trajectory of individual vehicles. There is a trade-off between privacy and the ability to detect and correct malicious data. Frequently changing keys increases privacy but offers less information to detect and correct malicious data.

Some care should be taken when changing keys to prevent the new and old identities from being linked. For example, if an isolated vehicle that frequently and regularly reports its position changes its key, then the two trajectories (one authenticated with the old key, the other with the new key) will likely be easily linked. To increase the ambiguity and make it harder to link trajectories, nodes can use one or more of the following: (1) changing keys at synchronized times, (2) introducing gaps in data reported near key changes, and (3) changing keys when nodes are near one another.

Model

We propose the following model of a VANET. Let P be a Euclidian space and let $\|P_1-P_2\|$ denote the Euclidian distance from point $P_1$ to $P_2$. We define events and nodes as follows:

An event E is a pair $E=(D, f)$, where D is the data associated with the event and $f$, the locator function, is a continuous function $f: T \rightarrow P$ that indicates the location of the event over the lifetime $T \subseteq R$ of the event. The lifetime of an event may be a single point in time $T=\{t\}$ or an interval of time $T=[t_0, t_1]$. The data associated with an event may be, e.g., the identity or speed of the node at the location given by $f(T)$.

A node is a triplet $(N,f,\rho)$, where:

N∈N is an integer that uniquely identifies the node, $f$, the locator function of the node, is a continuous function $f: T \rightarrow P$ that indicates the position of the node over the lifetime $T \subseteq R$ of the node, $\rho \in R^+$ is the observation radius, Assertions (observed events). Nodes can observe events that are within their observation radius, and share their observations with one another. We call an observed event an "assertion". The assertion $\langle(D, f)\rangle_{O_i}$ states that node $O_i$ (the observer) witnessed event $(D, f)$. The following rule explains the conditions under which a node can record an assertion. Let $(N_i, f_i, \rho_i)$ be a node and let $E=(D, f)$ be an event. Let $T_1$ be the lifetime of node $N_i$ and T be the lifetime of the event E. If $T \subseteq T_i$ and for all $t \in T$, we have $\|f(t)-f_i(t)\| \leq \rho_i$, then node $N_i$ can record the assertion $\langle(D, f)\rangle_{N_i}$.

Nodes may also share assertions with one another. While in practice the sharing of assertions may be limited by latency and bandwidth considerations, for purposes of exposition we will assume ideal propagation in our model. In other words, an assertion recorded by a node is instantly universally available to all other nodes. This assumption is justified by the fact that we consider only local propagation of assertions in a relatively small geographic neighborhood (an assertion is of less value to nodes far removed from the event). Note that a practical system must allow some time for propagation, but since we are applying this only to a small geographic neighborhood, it is easy to allow for these delays and to incorporate them in the analysis. We denote the global database of all assertions contributed by all nodes by K.

Model of the VANET. A model of the VANET specifies what events or sets of events are possible. The model may be rule-based or based on statistical properties of events. Formally, let $\epsilon$ be the set of all sets of events. The model of the VANET is a function M: $e \rightarrow \{valid, invalid\}$. A set of events $\{E_1, \ldots, E_n\} \in \epsilon$ is called consistent with the model of the VANET if $M(E_1, \ldots, E_n)=valid$ and inconsistent if $M(E_1, \ldots, E_n)=invalid$. We extend the domain of M to assertions (and sets of assertions) in the natural way. We may also consider models that return a probability $p \in [0, 1]$ of validity rather than making a binary decision between valid and invalid.

Our adversarial model is as follows: we assume that malicious nodes may record inaccurate or non existent events, i.e. they may enter wrong assertions into the database K.

Explaining a set of events. Let $H \subseteq N$ be a set of possible hypotheses. We assume the set H is partitioned into a subset $H^+$ of hypotheses of validity (e.g. "correct") and a set $H^-$ of hypotheses of invalidity (e.g. "malicious", "benignly faulty"). Let $K=\{\langle E_1 \rangle_{O_1}, \ldots, \langle E_n \rangle_{O_n}\}$ be a set of assertions. An explanation for K at node N is a labeling of each assertion in K with a hypothesis $$Exp_N(K)=\{\langle E_1 \rangle_{O_1}^{h_1}, \ldots, \langle E_n \rangle_{O_n}^{h_n}\}$$

where $h_i \in H$, such that the subset of assertions tagged with hypotheses of validity is consistent with the model of the VANET. Formally, let $$Exp_N^{H+}(K)=\{\langle E_i \rangle_{O_i}^{h_i} \in Exp_N(K) | h_i \in H^+\}$$

We have $M(Exp_N^{H+}(K))=valid$. As we will see later, in some cases it may be necessary to add assertions to K to find a consistent explanation. Note that the explanation $Exp_N(K)$ is defined with respect to a particular node N, since different nodes may assign different hypotheses to various assertions (consider for example that a node is likely to always consider its own assertions as truthful).

Ordering explanations. The model of the adversary also specifies an ordering of explanations. This is usually a total order based on some scoring of the explanations that will vary depending on the statistical methods used. For example, Occam's razor would score explanations based on their simplicity.

Addressing inconsistencies. Given a collection of data K invalid under a model of the VANET M, and an ordered collection of explanations of K, then either the data is declared invalid (an error is detected) or the errors in K are corrected by using the $H^+$ labeled assertions of the best explanation. If there are multiple nearly equal highly ranked explanations, their $H^+$ labeled assertions can be intersected and a subset of K corrected.

EXAMPLES

To illustrate this security framework, we consider two examples. The first illustrates how easy it is to detect and reject erroneous nodes if the collaborating sensor data is strong, while the second example illustrates the importance of distinguishability when the vehicles have weaker location sensor capabilities.

Observing Precise Location of Nearby Vehicles

For this first example, we assume that nodes are able to sense the precise location of all neighbors with which they can communicate, and that location sensing is bound with communication, so that a node's sensed location can be associated with its public key. The database K consists of tuples:

$$K=\{\langle N_1, \vec{x}_1\rangle_{O_1}, \langle N_2, \vec{x}_2\rangle_{O_2}, \langle N_3, \vec{x}_3\rangle_{O_3}, \ldots\}, \quad (1)$$

where the assertion $A_i = \langle N_i, \vec{x}_i\rangle_{O_i}$ can be interpreted as "node $O_i$ claims to have observed node $N_i$ at location $\vec{x}_i$." Under normal operation, node $O_i$ will not be able to observe nodes beyond a fixed radius $\rho$, in which case $\vec{x}_i$ will have value "unobserved." (With the multiple communication pathways assumption we made earlier, those tuples with $\vec{x}_i$ "unobserved" can be eliminated from the database and their values inferred from their absence.) Nodes can make assertions about themselves, in which case $O_i = N_i$, and we introduce the notation L corresponding to these reflexive assertions: $\langle N_i, \vec{x}_i\rangle_{N_i} \Rightarrow L(N_i) = \vec{x}_i$. The VANET model M(K) for this example returns valid if the following two geometric conditions both hold (and invalid otherwise):

1. K contains a reflexive assertion for each node

2. Every non-reflexive assertion $\langle N_i, \vec{x}_i\rangle_{O_i}$ in K agrees with the reflexive assertion for $N_i$, that is, we have $\vec{x}_i = L(N_i)$ if $\|\vec{x}_i - L(O_i)\| \leq \rho$ and $\vec{x}_i =$ unobserved otherwise.

If there are malicious nodes then K will not necessarily be consistent with M. In this example, an explanation at node N, denoted $\text{Exp}_N(K)$, consists of labeling each assertion in K with one of three designations, "truthful," $t \in H^+$, "malicious," $m \in H^-$ or "spoof," $s \in H^-$. Each labeled tuple, $$\langle N_i, \vec{x}_i\rangle_{O_i}^{h_i}, h_i \in H = \{t, m, s\},$$

in $\text{Exp}_N(K)$ must satisfy the following criteria:
1. If $O_i = N$ then $h_i = t$. In other words, the observations of the node constructing the explanation are considered truthful.
2. When an observer $O_i$ has been labeled a spoof ($h_i = s$) then none of the other tuples making assertions about $O_i$, such as $\langle N_k = O_i, \vec{x}_k\rangle_{O_k}^{h_k}$, should be labeled t unless $\vec{x}_i =$ unobserved.

For convenience we also allow an explanation to include new tuples labeled "added," $a \in H^+$, with one new tuple allowed for each reflexive tuple that has been labeled m. The added tuple will supply a correct location $\vec{x}_i^*$ that is consistent with any other truthful observations of $N_i$ in K:

$$\langle N_i, \vec{x}_i\rangle_{N_i}^m \Rightarrow \langle N_i, \vec{x}_i^*\rangle_{N_i}^a$$

The truthful and added assertions in $\text{Exp}_N(K)$, taken together, should be consistent with the model of the VANET:

$$M(\text{Exp}_N^{H+}(K)) = \text{valid}.$$

To complete the model of the adversary for this example, we score explanations $\text{Exp}_N$ according to the number of distinct observers $O_i$ that receive the malicious label m on one or more of their tuples. The explanation $\text{Exp}^*_N$ with the fewest malicious nodes is considered the simplest, and therefore the most plausible explanation of the data. If there are enough observations in K, then the data in $\text{Exp}^*_N(K)$ will identify the malicious nodes as well as provide correct locations for all nodes, both truthful and malicious. (In some instances there may be several explanations that are equally likely, in which case it may still be possible to extract some correct locations from the intersection of these explanations.)

Note that the model of the adversary for this example makes no distinction based on the number of malicious assertions by an observer; once one of an observer's assertions has been labeled malicious then they might as well all be labeled malicious. While it is possible to construct more elaborate models that assign some measure to the complexity of the deception created by a malicious observer (or models that allow for a few benign errors), this simple model has the appeal that it restricts the strategies available to the adversary.

We also note that the ranking of explanations ignores spoof labels in the explanations, so the better explanations will have more spoof nodes and fewer malicious nodes. However, the direct observations of truthful nodes (by the second criteria of the labeling described above) will limit the number of nodes that can be labeled as spoofs.

If there are only a few malicious nodes then the best explanation (or explanations if several are tied) can be computed exhaustively as follows: the explanations are computed by postulating a small number of malicious nodes, labeling all of the assertions of the postulated malicious nodes as malicious, treating the remaining assertions as arcs in a graph, beginning a breadth first search at N, traversing arcs from observer $O_i$ to node $N_i$ as long as $N_i$ is not already labeled m, and labeling nodes that are reached this way as truthful. All unreached nodes are labeled as spoofs. Not all of these labelings will be consistent with the model M, but by searching for fewer malicious nodes first, the algorithm can terminate when it has found one or more explanations of the same size that pass the consistency test.

Figure 2:
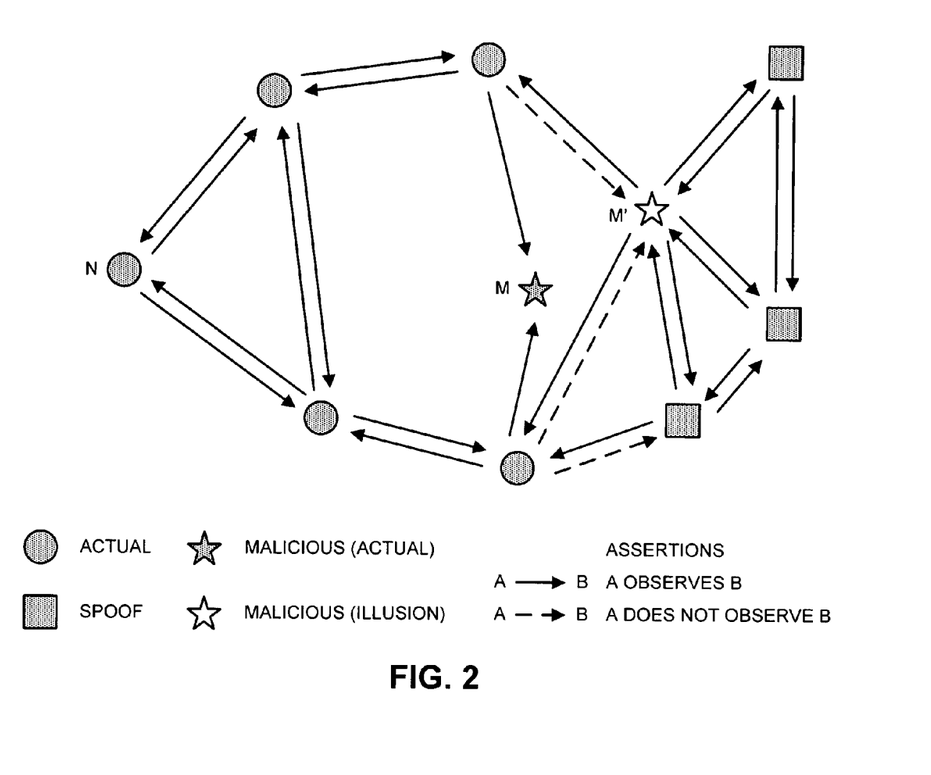
FIG. 2 illustrates how a single malicious node can create spoofs to support a false location for a node in accordance with an embodiment of the present invention.
Figure 3:
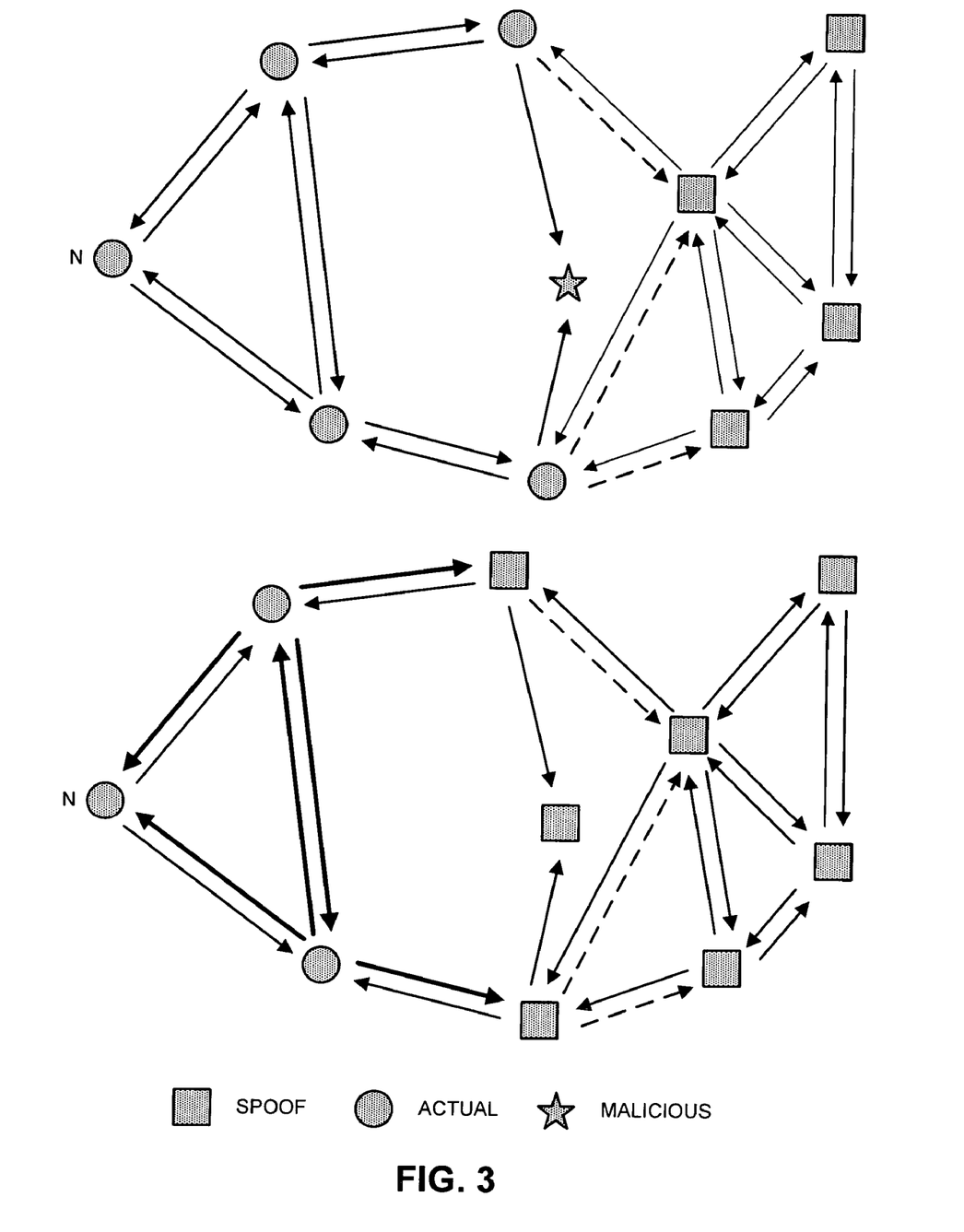
FIG. 3 illustrates two (of many) possible explanations for the conflicting observations in accordance with an embodiment of the present invention.

FIG. 2 shows the attempt of a single malicious node to create the illusion that it is at a nearby location. The malicious node has attempted to increase the evidence for its illusionary location by generating several spoof nodes, shown as squares, to support its illusion. The arrows show the observations appearing in the shared database, and the dashed arrows show some missing observations that will create geometric conflicts in the model, and thereby expose the attack. FIG. 3 shows two explanations for the conflicts. Note that while the malicious node attempted to bias the explanations by adding spoof nodes, this particular model of adversarial attack, where multiple real distinct attackers are deemed less likely than multiple spoof attackers, is able to choose the first (correct) explanation ahead of the second because it has fewer nodes labeled malicious. However, notice that the ability to find the correct explanation is dependent on the density of the graph.

Observing the Range of Nearby Vehicles

As a contrasting example, we consider the case in which nodes are only able to detect distances to their neighboring nodes. A broad class of weaker location sensor capabilities can be captured by modifying the assertions in the database to include a region $R_i$ rather than a single point, that is, $A_i = \langle N_i, R_i\rangle_{O_i}$. The observer $O_i$ asserts that $N_i$ is within region $R_i$, which might be a wedge or circle centered at $O_i$ depending on the location sensing technology used. Similarly, the geometric test is generalized to check $L(N_i) \in R_i$. It is less straightforward to generalize the adversarial model, the explanations, and the parsimony algorithm; we will illustrate these challenges using a simple range test (e.g. based on transmission timing) where $R_i$ is a circle of fixed radius $\rho$ centered at $L(O_i)$.

Figure 4:
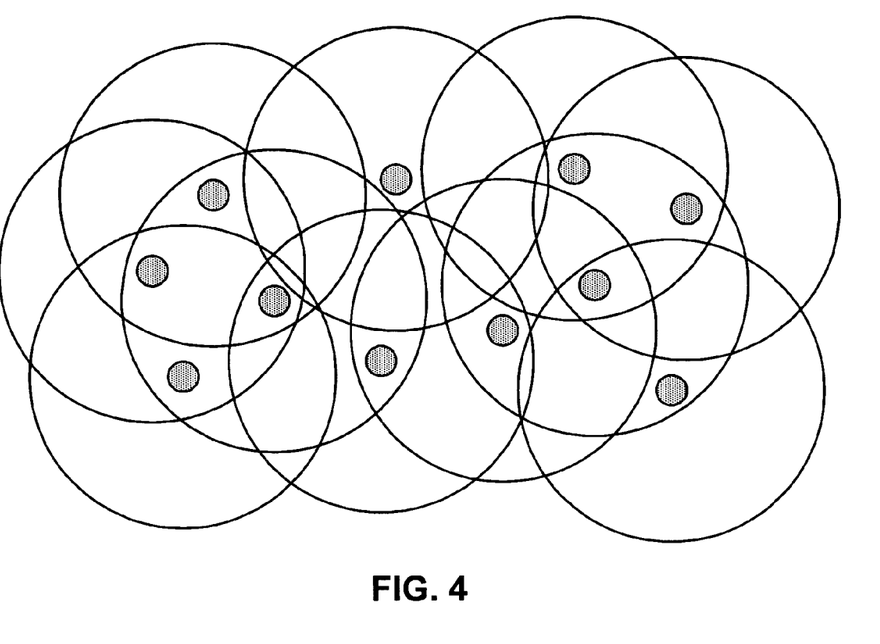
FIG. 4 a partition of a plane based on fixed range tests in accordance with an embodiment of the present invention.

In this example the principle challenge is to generate an explanation that may involve new locations for malicious nodes whose actual locations are not present anywhere in the data K. As above, we allow for missing data to be added to the explanation. Unlike above, malicious nodes will not necessarily have a location recorded in the database K. Nevertheless, we will add one new entry for each malicious node: $\langle N_i, S_i \rangle_{N_i}^a$, where $S_i$ is a possibly non-circular region where $N_i$ might actually be located. FIG. 4 shows a partition of the plane by circles radius $\rho$ around points in K. Regions in this partition have unique but constant range properties with respect to the nodes, and so would be candidates for $S_i$.

Here again we consider the explanation with the fewest malicious nodes (or equivalently the fewest added assertions) to be the best explanation. Unlike the previous example, malicious nodes in this example can generate spoofs that are observed by truthful nodes, as long as the malicious nodes are within range of the truthful observer. This phenomena can also be added to the explanation by introducing a new "illusion" label: $i \in H^-$. The i label can be applied to the observations of nodes whose observations would otherwise be considered truthful, t, provided that there is a malicious node nearby:

$$\langle N_i, R_i \rangle_{O_i}^t \Rightarrow \exists k: \langle N_k, S_k \rangle_{N_k}^a \wedge (S_k \subset R_i)$$

We can search for the best explanation by systematically postulating small numbers of malicious nodes located in regions $S_i$ of the partition shown in FIG. 4, and adding entries for these postulated malicious nodes, for example, $\langle N_k, S_k \rangle_{N_k}^a$. The rest of the data in K is labeled by breadth first search from N, treating the assertions in K as arcs and traversing from observer $O_i$ to node $N_j$. When considering the arc corresponding to assertion $\langle N_i, R_i \rangle_{O_j}$, if the observer is within range of a postulated malicious node $N_k$, with $L(N_k) = S_k$ and $S_k \subset R_i$, then the assertion is labeled as an illusion, and the arc is not traversed. The assertions for all arcs that are successfully traversed are labeled truthful, and all arcs that are not reached are labeled as spoofs. As with the previous example, the explanations passing the geometry test with the fewest malicious nodes are used to correct the data.

Figure 5:
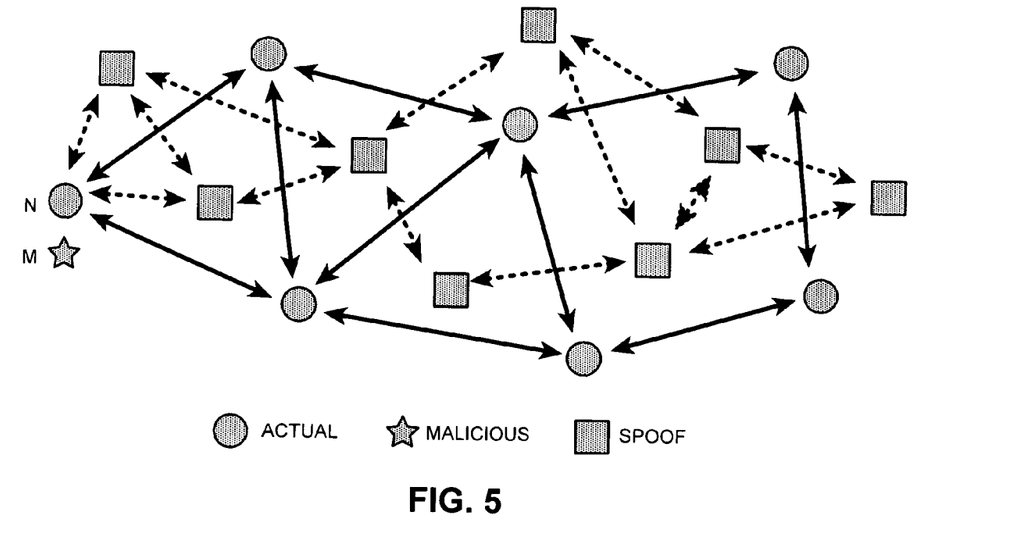
FIG. 5 illustrates how a malicious node can generate an alternate world as viewed by another node in accordance with an embodiment of the present invention.

In contrast to the earlier example, where every observed node was distinct, this example is at the opposite extreme—the location sensing is so imprecise that every observation could be generated by a single malicious node near the observer. (An example of a single malicious node generating a fictitious alternate world is shown in FIG. 5.) In fact, some additions must be made to the model or the parsimony approach will find an easy way to explain any inconsistencies in the data by postulating a single malicious node next to the observer and postulating that all other nodes are spoofs! This is clearly not the most plausible explanation—it is unlikely that the neighborhood would be devoid of real nodes. We could simply introduce a "tie breaking" into the ordering relation: choosing the explanation with the fewest malicious nodes and among those explanations choosing the explanation with the most truthful nodes. However, this would limit the parsimony approach to solutions with one malicious node. A more Bayesian version of this approach is to soften the VANET model so that it returns probabilities based on the density of nodes (unusually sparse or dense patterns of neighboring nodes would be assigned lower probabilities), and then incorporate these probabilities in the ordering of explanations.

Improving the VANET model alone does not resolve all difficulties with this kind of attack. FIG. 5 shows an example where an attacker positioned near node N is able to create a complete alternate view that may fit the VANET model very well. This is not the most serious attack: it is easily detected, and it requires a malicious node near each node attacked. Moreover, in the world of VANETs, where nodes are mobile, this attack requires a malicious node to move with an attacked node to maintain an illusion over time. Clearly, this is a costly attack, and the cost can be incorporated into the ordering relation to further focus the parsimony approach on the most likely explanations.

Finally, we note that this approach is generally dependent on topology, that is, the ability to detect and correct attacks will vary based on the locations of all the nodes. However there is a more serious dependency on topology in this example where location sensing is not able to provide a precise fix (even in combination with observations of neighbors); in this example there is always a possibility for nodes to slightly spoof their locations and remain undetected. FIG. 4 illustrates the slack in this example—any node shown could vary their reported location within their enclosing partition region. Fortunately the density of partition regions grows as $O(\rho^2 d^2)$, where d is the density of nodes, and so in denser regions the slight spoof attack is limited.

In both of the above examples, we have sketched algorithms that are capable of identifying the best explanations based on enumerating a small subset of all explanations. The computational aspects of this problem need further investigation, however, these examples already illustrate some computational challenges. In most cases finding the most likely explanation will be intractable, while at the same time there may be a smaller, polynomial, number of very likely explanations. In the above examples the problem becomes tractable when we assume a small constant limit on the number of malicious nodes (reasonable in a dynamic network). The introduction of stochastic information in the models, as indicated in the second example, will likely make the use of search heuristics and branch-and-bound techniques effective in exploring the most likely explanations. Finally we note that the task of finding the best explanation can be parallelized among the truthful nodes by having nodes share "hints" (in the form of candidate explanations) with their neighbors; when verified, these hints would accelerate the otherwise redundant branch-bound-search of the individual nodes.

Summary of the Data Analysis Process

Figure 6:
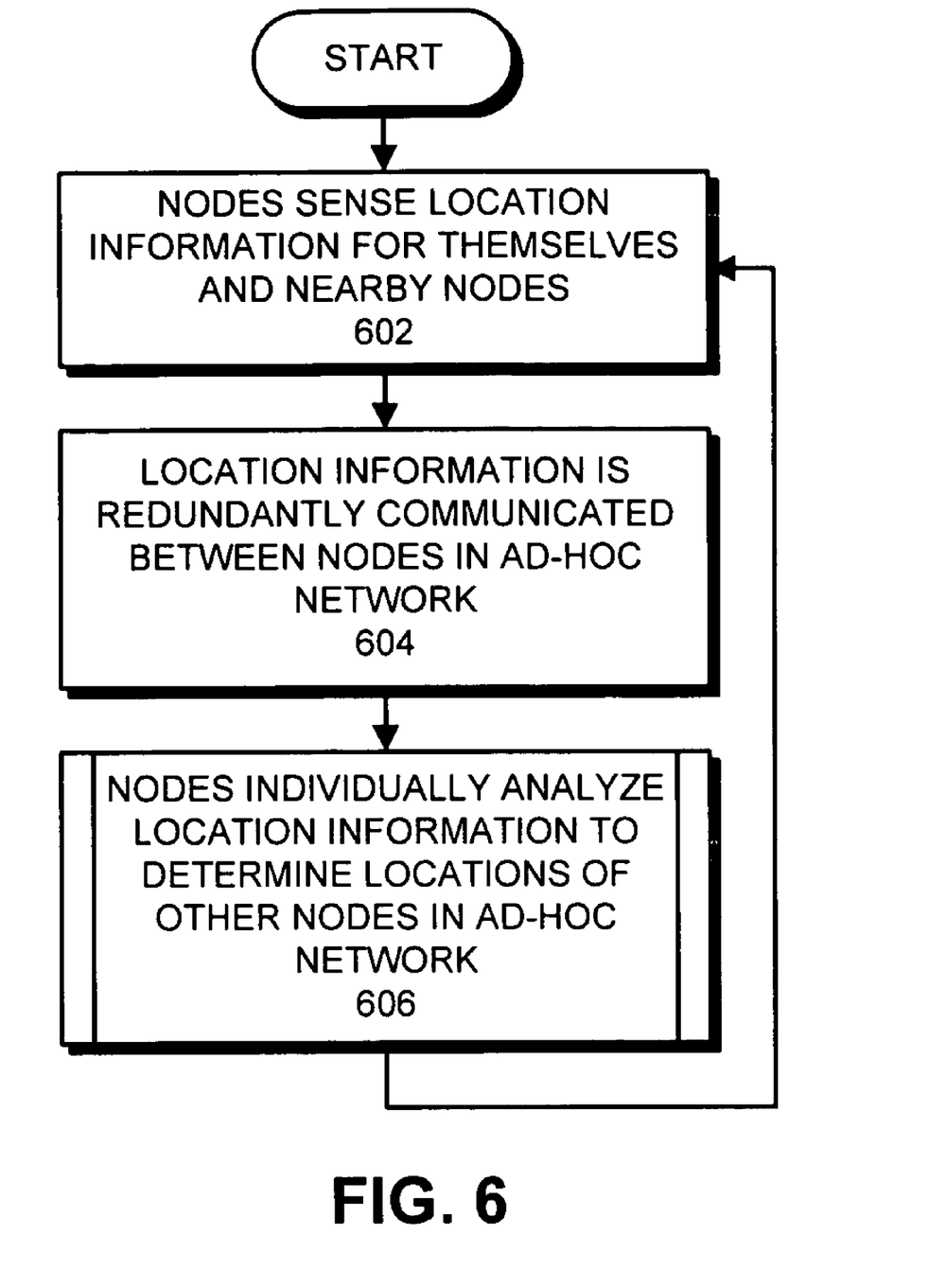
FIG. 6 presents a flow chart illustrating how nodes in the ad-hoc network gather, communicate and analyze data in accordance with an embodiment of the present invention.

FIG. 6 presents a flow chart illustrating how nodes in the ad-hoc network gather, communicate and analyze data in accordance with an embodiment of the present invention. During operation, the nodes periodically sense location information for themselves and for nearby nodes in the ad-hoc network (step 602). (Note that this information is not meant to be limited to location information. In general, the present invention can generally be applied to any type of information about nodes that can be gathered through sensors in the nodes and in nearby nodes.)

Next, this location information is redundantly communicated between nodes in the ad-hoc network (step 604). As was mentioned above, this redundant communication can involve a number of different protocols, such as a flooding protocol, a gossip protocol, or an epidemic protocol.

Finally, the nodes individually analyze this information to determine the locations of other nodes in the ad-how network (step 606). By having nodes individually analyze the information, the present invention provides a decentralized technique for determining the location of nodes in the ad-hoc network.

Figure 7:
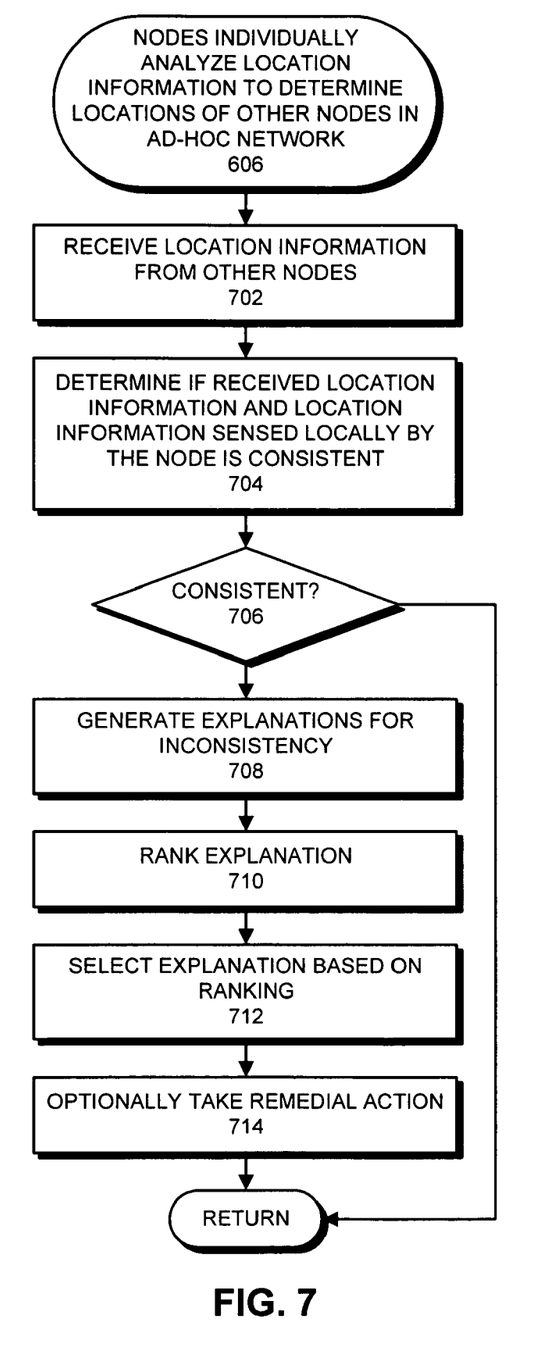
FIG. 7 presents a flow chart illustrating how an individual node analyzes data in accordance with an embodiment of the present invention.

FIG. 7 presents a flow chart illustrating how an individual node analyzes data in accordance with an embodiment of the present invention. First, the node receives location information from the other nodes in the ad-hoc network (step 702).

Next, the node determines if the received location information and location information sensed locally by the node are consistent (step 704). This involves comparing location information received different nodes to determine if the different nodes are reporting the same information. If this location information is consistent, the process is complete.

Otherwise, if this location information is not consistent, the system performs a number of operations. First, the system generates a set of explanations for the inconsistency (step 708). Next, the system ranks the explanations (step 710), and then selects an explanation based on the rankings (step 712). (Note that these operations are described in more detail in preceding sections of the specification.)

Finally, once an explanation has been determined, the system can (optionally) take a remedial action (step 714).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting malicious data in an ad-hoc network, comprising:
   receiving data at a node in the ad-hoc network, the data having purportedly been sensed by other nodes in the ad-hoc network,
      wherein a given node senses data associated with itself and with proximate nodes in the ad-hoc network, whereby proximate nodes in the ad-hoc network can redundantly sense data about each other,
      wherein the received data was redundantly communicated to the node by the other nodes in the ad-hoc network;
   determining, at the node, if the received data, along with data sensed locally by the node, is consistent; and
   if not, using a model which accounts for malicious nodes to determine an explanation for the inconsistency.

2. The method of claim 1,
   wherein nodes in the ad-hoc network are vehicles; and
   wherein the data includes location information for the vehicles.

3. The method of claim 1, wherein determining an explanation for the inconsistency involves:
   generating a set of explanations for the inconsistency;
   ranking the set of explanations according to likelihood; and
   selecting an explanation from the set of explanations based on the ranking.

4. The method of claim 3, wherein generating the set of explanations involves facilitating "local distinguishability" by comparing data which was sensed locally by the node with data received from the proximate nodes to determine if the proximate nodes are telling the truth, and if so labeling them as truthful nodes.

5. The method of claim 4, wherein generating the set of explanations also involves facilitating "extended distinguishability" by comparing data provided by truthful nodes with data received from nodes which are proximate to the truthful nodes to determine if the proximate nodes are telling the truth, and if so, labeling them as truthful nodes.

6. The method of claim 3, wherein ranking the set of explanations according to likelihood involves considering simpler explanations to be more likely than more complicated explanations.

7. The method of claim 1, wherein the model which accounts for malicious nodes also accounts for the possibility that malicious nodes can generate fictitious data from fictitious "spoof nodes" that do not actually exist.

8. The method of claim 1, further comprising using the explanation for the inconsistency to perform a remedial action.

9. The method of claim 8, wherein if there exist multiple nearly equally highly ranked explanations, these explanations can be combined to obtain a partial explanation for the inconsistency to facilitate taking a remedial action on part of the data.

10. The method of claim 1, wherein the received data was redundantly communicated between nodes in the ad-hoc network using:
    a flooding protocol;
    a gossip protocol; or
    an epidemic protocol.

11. A computer-readable storage medium storing instructions that when executed by a computer cause the computer to perform a method for detecting malicious data in an ad-hoc network, the method comprising:
    receiving data at a node in the ad-hoc network, the data having purportedly been sensed by other nodes in the ad-hoc network,
       wherein a given node senses data associated with itself and with proximate nodes in the ad-hoc network, whereby proximate nodes in the ad-hoc network can redundantly sense data about each other,
       wherein the received data was redundantly communicated to the node by the other nodes in the ad-hoc network;
    determining, at the node, if the received data, along with data sensed locally by the node, is consistent; and
    if not, using a model which accounts for malicious nodes to determine an explanation for the inconsistency.

12. The computer-readable storage medium of claim 11,
    wherein nodes in the ad-hoc network are vehicles; and
    wherein the data includes location information for the vehicles.

13. The computer-readable storage medium of claim 11, wherein determining an explanation for the inconsistency involves:
    generating a set of explanations for the inconsistency;
    ranking the set of explanations according to likelihood; and
    selecting an explanation from the set of explanations based on the ranking.

14. The computer-readable storage medium of claim 11, wherein generating the set of explanations involves facilitating "local distinguishability" by comparing data which was sensed locally by the node with data received from the proximate nodes to determine if the proximate nodes are telling the truth, and if so labeling them as truthful nodes.

15. The computer-readable storage medium of claim 14, wherein generating the set of explanations also involves facilitating "extended distinguishability" by comparing data provided by truthful nodes with data received from nodes which are proximate to the truthful nodes to determine if the proximate nodes are telling the truth, and if so labeling them as truthful nodes.

16. The computer-readable storage medium of claim 15, wherein ranking the set of explanations according to likelihood involves considering simpler explanations to be more likely than more complicated explanations.

17. The computer-readable storage medium of claim 11, wherein the model which accounts for malicious nodes also accounts for the possibility that malicious nodes can generate fictitious data from fictitious "spoof nodes" that do not actually exist.

18. The computer-readable storage medium of claim 11, wherein the method further comprises using the explanation for the inconsistency to perform a remedial action.

19. The computer-readable storage medium of claim 18, wherein if there exist multiple nearly equally highly ranked explanations, these explanations can be combined to obtain a partial explanation for the inconsistency to facilitate taking a remedial action on part of the data.

20. The computer-readable storage medium of claim 11, wherein the received data was redundantly communicated between nodes in the ad-hoc network using:
    a flooding protocol;
    a gossip protocol; or
    an epidemic protocol.

21. An apparatus that detects malicious data in an ad-hoc network, comprising:
    a receiving mechanism at a node in the ad-hoc network, which is configured to receive data purportedly been sensed by other nodes in the ad-hoc network,
        wherein a given node senses data associated with itself and with proximate nodes in the ad-hoc network, whereby proximate nodes in the ad-hoc network can redundantly sense data about each other,
        wherein the received data was redundantly communicated to the node by the other nodes in the ad-hoc network;
    a determination mechanism at the node configured to determine if the received data, along with data sensed locally by the node, is consistent; and
    wherein if not, the determination mechanism is configured to use a model which accounts for malicious nodes to determine an explanation for the inconsistency.

22. The apparatus of claim 21,
    wherein nodes in the ad-hoc network are vehicles; and
    wherein the data includes location information for the vehicles.

* * * * *